United States Patent [19]

Yamada et al.

[11] Patent Number: 5,137,981

[45] Date of Patent: Aug. 11, 1992

[54] HALOGENATED POLYBUTADIENE SERIES ELASTOMERS, METHOD OF PRODUCING THE SAME AND RUBBER COMPOSITIONS FOR TIRE CONTAINING THIS ELASTOMER

[75] Inventors: Tomoharu Yamada, Musashino; Ryota Fujio, Akigawa, both of Japan

[73] Assignee: Bridgestone Corporation, Tokyo, Japan

[21] Appl. No.: 347,082

[22] Filed: May 26, 1989

Related U.S. Application Data

[63] Continuation-in-part of Ser. No. 305,043, Feb. 2, 1989, abandoned.

[30] Foreign Application Priority Data

Feb. 2, 1988 [JP] Japan .................................. 63-21256
Feb. 2, 1988 [JP] Japan .................................. 63-21258

[51] Int. Cl.$^5$ .......................... C08F 36/06; C08F 8/18; C08C 19/12
[52] U.S. Cl. ............................... 525/332.3; 525/359.3; 525/359.4
[58] Field of Search ................... 525/335, 359.3, 332.3, 525/359.4; 546/302

[56] References Cited

U.S. PATENT DOCUMENTS 4,117,036  9/1978  Honda et al. ................. 525/359.3
4,752,649  6/1988  Neckers ....................... 560/302

OTHER PUBLICATIONS

Chemical Abstracts 87:137098d Polymer Compositions; Jun. 1977.
Chemical Abstracts 66:76761g Aug. 1966.

*Primary Examiner*—Paul R. Michl
*Assistant Examiner*—Peter Szekely
*Attorney, Agent, or Firm*—Sughrue, Mion, Zinn, Macpeak & Seas

[57] ABSTRACT

A novel halogenated polybutadiene series elastomer is produced by reacting a polybutadiene series elastomer with a particular active halogen group-containing compound in the presence of a particular organic halogenating agent. The resulting halogenated polybutadiene series elastomer can be subjected to heat-resistant crosslinking with a particular polyvalent amine, and is suitable for the preparation of rubber compositions for tire requiring the heat resistance.

15 Claims, 2 Drawing Sheets

HALOGENATED POLYBUTADIENE SERIES ELASTOMERS, METHOD OF PRODUCING THE SAME AND RUBBER COMPOSITIONS FOR TIRE CONTAINING THIS ELASTOMER

This application is a continuation-in-part of the co-pending application Ser. No. 305,043 filed Feb. 2, 1989, now abandoned.

BACKGROUND OF THE INVENTION

1. Field of the Invention

This invention relates to novel halogenated polybutadiene series elastomers, a method of producing the same and a rubber composition for tire containing this elastomer, and more particularly to a novel polybutadiene series elastomer having a halogen group capable of being subjected to heat-resistant crosslinking, a method of producing the same as well as a rubber composition for tire containing this elastomer and having an excellent heat resistance in high-speed and high-performance pneumatic tires continuously used at high temperature state.

The halogenated polybutadiene series elastomers produced by the method according to the invention can be subjected to heat-resistant crosslinking with an amine series compound as mentioned below. When the resulting crosslinked rubber is used in tire parts, particularly tread, carcass and belt of automobile tires, particularly highspeed running tires for racing, motor sport and the like, troubles such as tire burst and the like due to a great amount of heat generated during the running at high speed can be prevented to ensure the stable running of the tire under heat-resistant state.

2. Related Art Statement

Recently, in the automobile tire, the use limit temperature of the tire tread becomes higher in accordance with the improvement of performances in the automobile, completion of expressway network and improvement of high-speed running performances of the tire, and consequently the heat resistance is more highlighted as a performance required in the tread.

Heretofore, a method of increasing number of monosulfide bonds in the crosslinking and the like have been proposed as a technique for improving the heat resistance, but the improved level is still insufficient. Further, the crosslinking with a peroxide provides an excellent heat resistance, but the scorching property is poor and the crosslinking speed is slow, so that such a crosslinking is not practical.

It is known from old times that when a halogen such as chlorine gas or the like is acted to a polybutadiene series elastomer such as styrene-butadiene copolymer rubber, polybutadiene rubber or the like, the addition reaction of halogen to unsaturated bond is produced. However, the resulting product is poor in the practical value, so that the detailed examination thereof is hardly attempted.

In order to ensure the heat stability of rubber, or in order to lessen the degradation at high temperature as far as possible, it is particularly important that the heat stability through crosslinking is high. In this connection, it is known that Friedel-Crafts reaction is carried out between chlorobutyl rubber or bromobutyl rubber and an aromatic amine such as N,N'-dipehnyl-p-phenylene diamine or the like to provide a crosslinked structure having a high heat resistance (D. C. Edwards, *Rubber Chemistry and Technology*, vol. 60, page 62, 1987). Such a vulcanization is called as TP curing.

In case of styrene-butadiene copolymer rubber frequently used in the tire tread, when this rubber is reacted with a halogen molecule, a simple addition reaction is merely caused, so that it is impossible to obtain excellent heat resistance even by crosslinking the resulting product with the above aromatic amine.

Further, in order to apply such a TP curing to polybutadiene series elastomers such as cis-1,4-polybutadiene, styrene-butadiene copolymer and the like, it is required to effectively introduce an active halogen group into these elastomers, but such an attempt is not yet successful. In this case, a halogen group capable of bonding at an allylhalogen structure or benzylhalogen structure may be mentioned as the active halogen group. Therefore, in order to introduce such an active halogen structure into the polybutadiene series elastomer, it is first considered that a halogen such as chlorine gas or the like is directly reacted with the elastomer. In this case, however, the introduction of allylhalogen structure is not successful because the following addition reaction is usually caused:

SUMMARY OF THE INVENTION

The inventors have noticed that the heat stability of the crosslinking largely sways the heat resistance of rubber as mentioned above and made various studies in order to solve the aforementioned problems. As a result, it has been found that the above problems can be solved by adding an organic acid having an allylhalogen structure or benzylhalogen structure to carbon-carbon unsaturated bond of the polybutadiene series elastomer and further the excellent rubber crosslinking can be obtained when the resulting elastomer is crosslinked with a polyvalent amine, and the invention has been accomplished. According to a first aspect of the invention, there is the provision of a novel halogenated polybutadiene series elastomer having in its molecular chain the following structure:

(wherein A is one of the following six residues:

X is a halogen atom, R is a hydrogen atom or a methyl group, and each of x, y and z is zero or a positive integer).

According to a second aspect of the invention, there is the provision of a method of producing a novel halogenated polybutadiene series elastomer, which comprises reacting a polybutadiene series elastomer with at least one active halogen group-containing compound selected from the group consisting of the following compounds:

(I)

(II)

(III)

(wherein X is a halogen atom and R is a hydrogen atom or a methyl group) in the presence of at least one organic halogenating agent selected from the group consisting of an alkyl hypohalite, trihalo isocyanuric acid and an N-haloamide compound represented by the following general formula:

(wherein X is a halogen atom, A is a carboxylic acid residue, a sulfonic acid residue or a carbonic monoester residue, and B is a hydrogen atom, a halogen atom or a carboxylic acid residue).

According to a third aspect of the invention, there is the provision of a rubber composition for tire comprising adding 0.3~10 parts by weight of a polyvalent amine to 100 parts by weight of a starting rubber consisting of 30-100 parts by weight of a halogenated polybutadiene series elastomer having in its molecular chain the following structure:

(wherein A is one of the following six residues:

X is a halogen atom, R is a hydrogen atom or a methyl group, and each of x, y and z is zero or a positive integer) and having a halogen content of 0.3~5.0% by weight and 70 0 parts by weight of the other conjugated diene series polymer.

BRIEF DESCRIPTION OF THE DRAWINGS

The invention will be described with reference to the accompanying drawings, wherein.

DESCRIPTION OF THE PREFERRED EMBODIMENTS

The halogenated polybutadiene series elastomers according to the invention have a considerably rich reactivity based on the active halogen group introduced into their molecular chain, so that they can provide a crosslinked structure having a high heat resistance by Friedel-Crafts reaction with an aromatic compound or a condensation reaction with an amine compound. In this case, the former reaction is called as TP curing, and the latter reaction is called as amine curing.

According to the invention, for example, when polybutadiene of cis-1,4 type structure is reacted with the halogen group-containing compound of the above formula (I), (II) or (III) in an organic solvent such as toluene or the like in the presence of tertiary butyl hypohalite as the organic halogenating agent, the reaction mechanism can be shown as follows:

When using the compounds of the formula (I) and (II), the benzylhalogen structure is obtained, while when using the compound of the formula (III), the allylhalogen structure is obtained. Thus, the active halogen group can be introduced into the molecule of the polybutadiene according to the method of the invention.

As the starting polybutadiene series elastomer used in the invention, mention may be made of polybutadiene, butadiene-styrene copolymer, butadiene-acrylonitrile copolymer, butadiene-methacrylic acid copolymer, butadiene-methyl methacrylate copolymer, butadiene-isoprene copolymer and the like. The molecular weight of these starting elastomers is not critical and is properly selected in accordance with the use purpose and the like, but it is preferable to be not less than about 100,000.

According to the invention, the above starting polybutadiene series elastomer is used by dissolving into a proper solvent, but it is advantageous that the reaction is carried out in a rubber cement after the completion of polymerization in industry. The solvent used is selected from compounds having a good affinity with the starting polybutadiene series elastomer and stably dissolving the alkyl hypohalite, N-haloamide, trihalo isocyanuric acid and active halogen group-containing compound, and may be used alone or in admixture. As the solvent, mention may be made of aliphatic solvents such as pentane, hexane, heptane, octane and the like; alicyclic solvents such as cyclohexane and the like; aromatic solvents such as benzene, toluene and the like; polar solvents such as acetone, methyl ethyl ketone, ethyl acetate and the like; hydrocarbon solvents such as methylene chloride, chloroform, carbon tetrachloride and the like. Among these solvents, benzene, toluene, hexane, cyclohexane, acetone and methyl ethyl ketone are preferable.

The active halogen group-containing compounds used in the invention are represented by the above general formulae (I), (II) and (III). As the formula (I), there are p-bromomethyl benzoic acid, p-chloromethyl benzoic acid and so on. As the formula (II), there are α-bromophenyl acetic acid, α-chlorophenyl acetic acid, α-bromophenyl propionic acid and so on. As the formula (III), there are α-bromomethyl acrylic acid, α-chloromethyl acrylic acid, α-bromomethyl crotonic acid and so on. These active halogen group-containing compounds are used in an amount of 0.001~0.03 mol in total, preferably 0.002~0.02 mol in total per 100 g of the starting polybutadiene series elastomer. When the amount used is less than 0.001 mol in total, the improvement of heat resistance in the vulcanizate is not observed, while when it exceeds 0.03 mol, the resulting vulcanizate loses properties inherent to polybutadiene rubber, and particularly the tensile strength and elongation considerably decrease.

Among the organic halogenating agents used in the invention, the alkyl hypohalite includes primary alkyl hypohalites, secondary alkyl hypohalites and tertiary alkyl hypohalites. Among them, stable tertiary alkyl hypohalites such as t-butyl hypochlorite, t-butyl hypobromide, t-amyl hypochlorite and the like are preferable. Among the N-haloamide compounds of the formula:

the compound having a carbonic monoester residue includes N,N-dichloroethyl urethane, N,N-dichloromethyl urethane and so on, and the compound having a sulfonic acid residue includes N,N-dichlorobenzene sulfonamide, N,N-dibromobenzene sulfonamide, N,N-dichlorotoluene sulfonamide and so on, and the compound having a carboxylic acid residue includes N,N-dichloro acetoamide, N-chloro succinic acid imide, N-bromo succinic acid imide and so on. The trihalo isocyanuric acid includes trichloro isocyanuric acid and the like.

The organic halogenating agent is usually used in a mol ratio of 1:1 to the active halogen group-containing compound. However, such a mol ratio can properly be changed, if necessary.

The reaction temperature and reaction time are not particularly restricted, but they are usually 0°~100° C. and 3 minutes ~3 hours.

After the completion of the reaction on the starting polybutadiene series elastomer, operations such as neutralization and the like are carried out, if necessary, and then the reaction mixture is poured into a great amount of alcohol or hot water to conduct the solidification of the elastomer. Then, impurities remaining in the elastomer is removed by washing, if necessary, and thereafter the elastomer is dried to obtain a desirable halogenated polybutadiene series elastomer according to the invention.

The rubber composition for tire according to the invention comprises the above halogenated polybutadiene series elastomer and the other conjugated diene series polymer as a starting rubber and a given amount of a polyvalent amine per 100 parts by weight of the starting rubber. In this case, the halogen content of the halogenated polybutadiene series elastomer is necessary to be 0.3~5.0% by weight, preferably 0.5~3.0% by weight. When the halogen content is less than 0.3% by weight, the sufficient crosslinked density is not obtained, while when it exceeds 5% by weight, there is caused a problem on the scorching at the processing step.

In the rubber composition according to the invention, the amount of the halogenated polybutadiene series elastomer contained in 100 parts by weight of the starting rubber is necessary to be at least 30 parts by weight for obtaining sufficient heat resistance of the resulting crosslinked rubber. The other conjugated diene series polymer is not critical, but there are preferably used natural rubber, polyisoprene rubber, emulsion polymerized styrene-butadiene copolymer rubber, solution polymerized styrene-butadiene copolymer rubber, polybutadiene rubber and the like.

As the polyvalent amine, mention may be made of aliphatic or alicyclic primary or secondary amines such as hexamethylene diamine, heptamethylene diamine, methylene bis(cyclohexylamine), 1,3-di-4-piperidyl propane, 4,4'-dipiperidyl and the like; alicyclic tertiary diamines such as triethylene diamine and the like; aromatic primary diamines such as 4,4'-methylene dianiline and the like; aromatic secondary diamines such as N,N'-diphenyl-p-phenylene diamine (DPPD), di-β-naphthyl-phenylene diamine and the like; and trivalent or more amine compounds such as diethylene triamine, triethylene tetramine, tetraethylene pentamine and the like. Among them, N,N'-diphenyl-p-phenylene diamine is preferable.

The amount of the polyvalent amine added is 0.3~10 parts by weight, preferably 0.5~5.0 parts by weight per 100 parts by weight of the starting rubber. When the amount is less than 0.3 part by weight, the sufficient crosslinking is not obtained, while when it exceeds 10 parts by weight, there is caused a problem on the scorching.

When the halogenated polybutadiene series elastomer in the above rubber composition is cured by
(1) condensation reaction with the aliphatic or alicyclic primary or secondary diamine (amine curing) or
(2) Friedel-Crafts reaction with the aromatic secondary diamine such as N,N'-diphenyl-p-phenylene di- amine or the like (TP curing), a vulcanizate having a very excellent heat resistance is obtained from the rubber composition according to the invention.

An example of reaction formula in the above amine curing and TP curing is shown by the following formulae (IV) and (V):

ZnO ⟶

ZnO ⟶

Further, the rubber composition according to the invention may contain additives usually used in the rubber industry, such as a vulcanizing agent, a vulcanization accelerator, an accelerator activator, a filler, a reinforcing agent and the like. As the reinforcing agent, use may be made of carbon blacks of GPF, FEF, HAF, SAF, ISAF, IISAF, FT, MT, HPC grades and the like having an average particle size of 10~500 μm; process oils such as aromatic oil, naphtenic oil and the like; silica series reinforcing agents having an average particle size of 10~100 μm such as anhydrous silicic acid obtained by dry process, hydrous silicic acid obtained by wet process and the like. As the filler, calcium carbonate, clay, talc and the like are properly used.

These reinforcing agent and filler are usually used in an amount of 1~200 parts by weight, preferably 10~120 parts by weight per 100 parts by weight of the halogenated polybutadiene series elastomer in accordance with the use purpose.

Moreover, the heat-resistant crosslinking with the polyvalent amine may be carried out together with another vulcanization system, if necessary. In this case, sulfur, thiuram series or thiazole series sulfur donars, peroxide, urethane vulcanizing agent, resin vulcanizing agent and the like may be used as a vulcanizing agent. As the vulcanization accelerator, mention may be made of sulfenamides, thiuram series compounds, thiazoles, guanidine, mercaptotriazine, aldehyde-amine. As the accelerator activator, mention may be made of carboxylic acids such as stearic acid, oleic acid and the like; and metallic compounds such as zinc stearate, zinc oxide, magnesium oxide, calcium hydroxide, lead carbonate and the like. An example of the softener includes paraffinic, naphtenic and aromatic process oils. An example of the tackifier includes rosin, petroleum hydrocarbon resin, coumarone resin, phenol-terpene resin and the like. An example of the antioxidant includes amine compound, phenolic compound and the like. Moreover, the vulcanization accelerator and the accelerator activator are used when the vulcanization is carried out together with the above sulfur vulcanizing system.

In the formation of the rubber composition, the means for mixing various components is not critical, but various rubber kneaders are usually used. Particularly, carbon black and various process oils may be mixed at the production step of starting rubber or at the halogenating step to form a carbon master batch and oil master batch.

The rubber compositions containing the halogenated polybutadiene series elastomer according to the invention are excellent in the heat resistance, so that they are preferably used in the racing tire and the passenger car tire running at high speed. Of course, these rubber compositions are applicable to carcass, tread, sidewall, bead filler and inner liner in ordinary passenger car tire and large size tire for truck and bus as well as various rubber insulators, industrial belt and the like.

The following examples are given in illustration of the invention and are not intended as limitations thereof.

EXAMPLE 1

25 g of high-styrene SBR (styrene content: 46%, trade name JSR 0202) was dissolved in 500 ml of toluene, to which was added 0.43 g (0.002 mol, 0.008 mol/100 g of elastomer) of α-bromophenyl acetic acid. To the resulting mixed solution was added dropwise a solution of 0.22 g(0.002 mol) of tertiary butyl hypochlorite in 10 ml of toluene at 75° C. with stirring, and further reacted for 1 hour. Thereafter, the reaction mixture was poured into 2 l of methanol containing 20 g of an antioxidant (2,6-di-t-butyl-4-methyl phenol: BHT) to solidify the elastomer, which was thoroughly washed with a new BHT-containing methanol and dried over a day in a vacuum dryer to obtain a sample a. As a result of infrared spectrophotometric analysis on the sample a, absorption based on ester bond of 1740 cm$^{-1}$, which was not existent in the starting material (JSR 0202), was remarkably observed. This shows the introduction of "benzylhalogen structure" into the sample a as shown by the following reaction formula:

Then, an unvulcanized rubber composition was prepared by kneading on a small roll according to a compounding recipe shown in the following Table 1.

TABLE 1

| Compounding recipe | A | C |
|---|---|---|
| elastomer sample a | 100 | — |
| JSR 0202 | — | 100 |
| carbon black HAF | 50 | 50 |
| stearic acid | 2 | 2 |
| zinc oxide | 3 | 3 |
| methylene bis(cyclohexylamine) (MBCA) | 2 | — |
| N,N'-diphenyl-p-phenylene diamine (DPPD) | — | 2 |
| 1,3-diphenylquanidine | — | 1.2 |
| dibenzothiazyl disulfide | — | 0.6 |
| sulfur | — | 2.2 |

Figure 1:
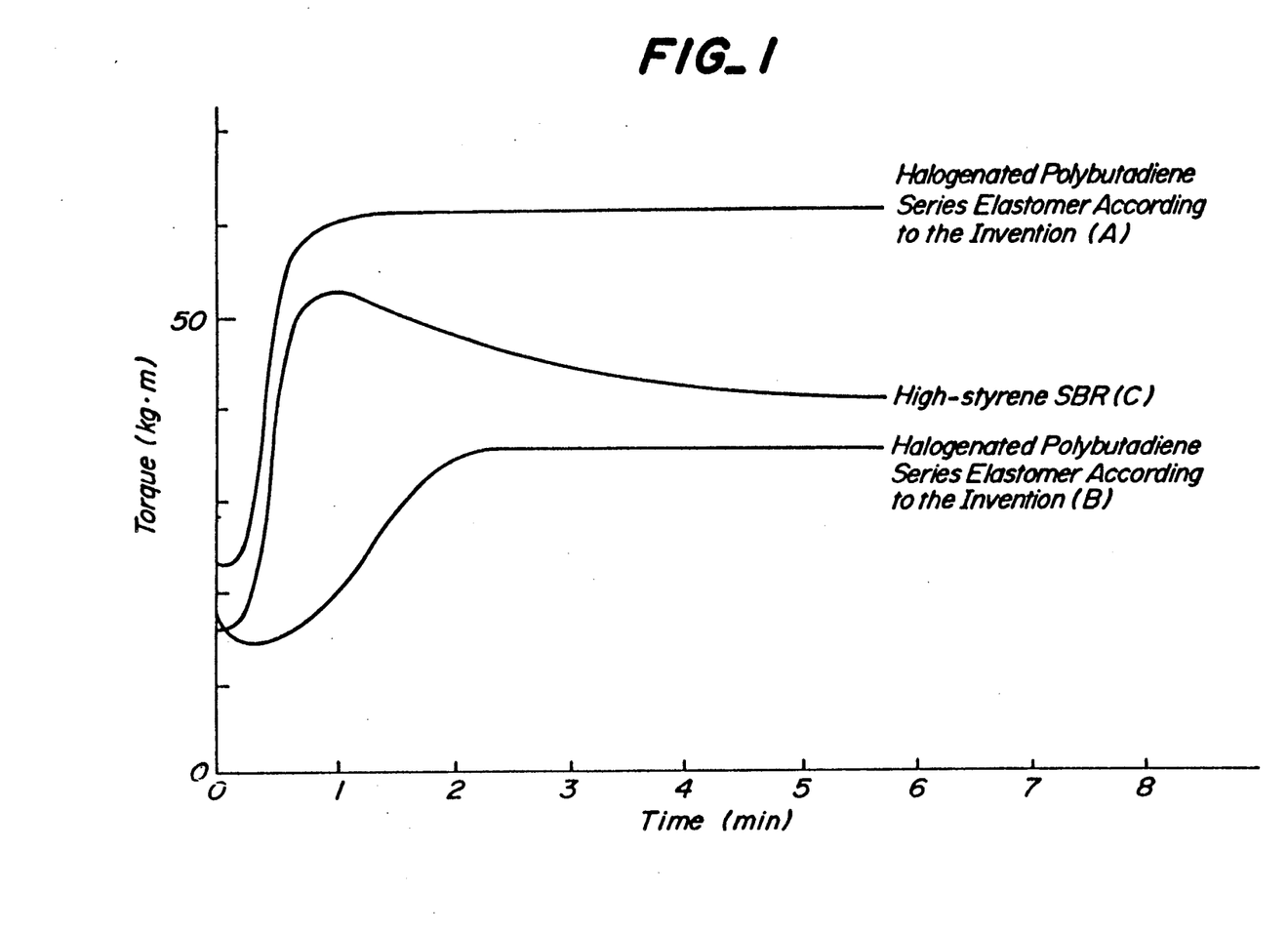
FIG. 1 is a vulcanization curve when each of two halogenated polybutadiene series elastomers obtained by the method according to the invention and high-styrene SBR is cured at 230° C.

In Table 1, the unvulcanized rubber composition A was a case of curing the sample a with methylene bis(cyclohexylamine) (MBCA), while the unvulcanized rubber composition C was a case of curing JSR 0202 (high-styrene SBR) with sulfur as a control. In FIG. 1 are shown vulcanization curves of both the compositions as measured at 230° C. by means of an oscillating disc rheometer (made by Monsanto). The following Table 2 shows tensile properties of the vulcanizates made from these compositions.

TABLE 2

| Sample* | A | C |
|---|---|---|
| 100% modulus (kg/cm$^2$) | 70 | 55 |
| tensile strength (kg/cm$^2$) | 322 | 295 |
| elongation (%) | 260 | 300 |

*vulcanizaton condition: 155° C. × 30 minutes

EXAMPLE 2

An elastomer sample b was prepared by using p-bromomethyl benzoic acid instead of α-bromophenyl acetic acid in the same manner as in Example 1. Then, an unvulcanized rubber composition B was prepared by kneading on a small roll according to a compounding recipe as shown in the following Table 3.

TABLE 3

| Compounding recipe | B |
| --- | --- |
| elastomer sample b | 100 |
| carbon black HAF | 50 |
| stearic acid | 2 |
| zinc oxide | 3 |
| N,N'-dipehnyl-p-phenylene diamine (DPPD) | 2 |

In FIG. 1 is a also shown a vulcanization curve of the composition B as measured at 230° C. by means of an oscillating disc rheometer (made by Monsanto). The following Table 4 shows the tensile properties of a vulcanizate made from the composition B together with those of the control C.

TABLE 4

| Sample* | B | C |
| --- | --- | --- |
| 100% modulus (kg/cm$^2$) | 47 | 55 |
| tensile strength (kg/cm$^2$) | 261 | 295 |
| elongation (%) | 380 | 300 |

*vulcanization condition: 155° C × 30 minutes

EXAMPLE 3

An elastomer sample d was prepared by using high-cis polybutadiene (trade name: JSR BR01) instead of high-styrene SBR in the same manner as in Example 1. Then, unvulcanized rubber compositions D and E were prepared by kneading on a small roll according to a compounding recipe as shown in the following Table 5.

TABLE 5

| Compounding recipe | D | E |
| --- | --- | --- |
| elastomer sample d | 100 | — |
| BR01 | — | 100 |
| carbon black HAF | 50 | 50 |
| stearic acid | 2 | 2 |
| zinc oxide | 3 | 3 |
| aromatic oil | 10 | 10 |
| MBCA | 2 | — |
| DPPD | — | 2 |
| 1,3-diphenylquanidine | — | 0.2 |
| dibenzothiazyl disulfide | — | 0.8 |
| sulfur | — | 1.75 |

Figure 2:
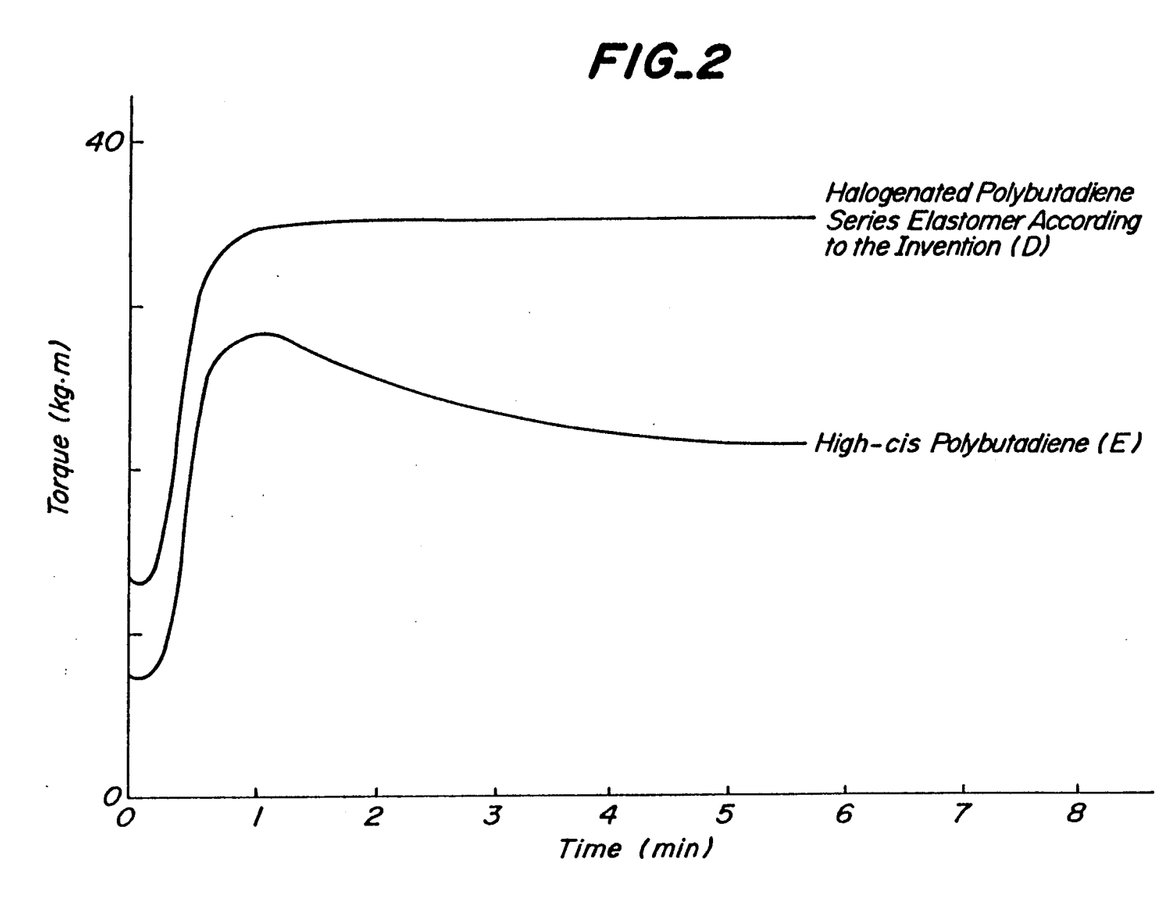
FIG. 2 is a vulcanization curve when each of a halogenated high-cis polybutadiene obtained by the method according to the invention and high-cis polybutadiene is cured at 230° C.

In Table 5, the unvulcanized rubber composition D was a case of curing the sample d with methylene bis(-cyclohexylamine) (MBCA), while the unvulcanized rubber composition E was a case of curing BR01 (high-cis polybutadiene) with sulfur as a control. In FIG. 2 are shown vulcanization curves of both the compositions as measured at 230° C. by means of an oscillating disc rheometer (made by Monsanto). The following Table 6 shows tensile properties of the vulcanizates made from these compositions.

TABLE 6

| Sample* | D | E |
| --- | --- | --- |
| 100% modulus (kg/cm$^2$) | 14.3 | 12.3 |
| tensile strength (kg/cm$^2$) | 155 | 151 |
| elongation (%) | 590 | 625 |

*vulcanization condition: 155° C. × 30 minutes

EXAMPLES 4–6, COMPARATIVE EXAMPLES 1–3

100 g of SBR #1502 was dissolved in 2 l of toluene, to which was added 1.72 g (0.008 mol/100 g of elastomer) of α-bromophenyl acetic acid.

To the resulting mixed solution was added dropwise a solution of 0.87 g (0.008 mol) of tertiary butyl hypochlorite in 40 ml of toluene at 75° C. with stirring, and further reacted for 1 hour. Thereafter, it was poured into 8 l of methanol containing 20 g of an antioxidant (2,6-di-t-butyl-4-methyl phenol: BHT) to solidify the elastomer, which was thoroughly washed with a new methanol containing BHT and dried over a day in a vacuum dryer to obtain a sample f. The halogen content of the sample f was 0.6% by weight. As a result of infrared spectrophotometric analysis on the sample f, absorption based on ester bond of 1740 cm$^{-1}$, which was not existent in the starting material (SBR #1502), was considerably observed.

The same procedure as mentioned above was repeated by varying the amount of halogenating agent used to obtain a sample g having a halogen content of 1.0% and a sample h having a halogen content of 6.0%, respectively.

Rubber compositions were prepared by using these samples and kneading on a small roll according to a compounding recipe as shown in the following Table 7.

TABLE 7

| Compounding recipe | parts by weight |
| --- | --- |
| polymer | 100 |
| carbon black SAF | 80 |
| aromatic oil | 40 |
| stearic acid | 2 |
| polyvalent amine*1 | see Table 8 |
| zinc white | 4 |
| DPG*2 | 0.3 |
| DM*3 | 1.2 |
| sulfur | see Table 8 |

*1:N,N'-diphenyl-p-phenylene diamine
*2:diphenylguanidine
*3:dibenzothiazyl disulfide The Mooney scorch time as a measure for processability and the blowout temperature as a measure for heat resistance were measured with respect to various rubber compositions obtained by changing the kind of the polymer, amount of polyvalent amine and amount of sulfur based on the compounding recipe of Table 7 to obtain results as shown in Table 8. Moreover, the vulcanization conditions were 155° C.×30 minutes.

The Mooney scorch time was evaluated according to a method of JIS K6300.

The blowout temperature was evaluated by placing a vulcanized rubber specimen of about 7 mm×7 mm×3.5 mm in an electric crucible made by Isuzu Seisakusho K.K. and raising a temperature from 180° C. to 250° C. every 2° C. while holding the given temperature for about 20 minutes, during which the occurrence of bubbles inside the specimen was visually observed.

TABLE 8

| | Comparative Example 1 | Example 4 | Example 5 | Comparative Example 2 | Comparative Example 3 | Example 6 |
| --- | --- | --- | --- | --- | --- | --- |
| SBR #1500 | 100 | | | | 80 | 60 |
| Sample f | | 100 | | | | |

TABLE 8-continued

|  | Comparative Example 1 | Example 4 | Example 5 | Comparative Example 2 | Comparative Example 3 | Example 6 |
| --- | --- | --- | --- | --- | --- | --- |
| (halogen content: 0.6 wt %) |  |  |  |  |  |  |
| Sample g |  |  | 100 |  | 20 | 40 |
| (halogen content: 1.0 wt %) |  |  |  |  |  |  |
| Sample h |  |  |  | 100 |  |  |
| (halogen content: 6.0 wt %) |  |  |  |  |  |  |
| N,N'-diphenyl-p-phenylene diamine | — | 1.0 | 2.0 | 3.0 | 3.0 | 3.0 |
| sulfur | 1.5 | 1.3 | 1.0 | 0.5 | 1.5 | 1.5 |
| Mooney scorch time (min) | 22 | 21.5 | 21.3 | 12.0 | 21.5 | 21.5 |
| Blowout temperature (°C.) | 185 | 223 | 228 | 210 | 186 | 208 |

EXAMPLE 7, COMPARATIVE EXAMPLE 4

A sample i having a halogen content of 0.9% by weight was prepared by using high-cis polybutadiene (trade name: JSR BR01) instead of SBR #1502 in the same manner as in Example 4.

A rubber composition was prepared by using the above sample and kneading on a small Banbury mixer according to a compounding recipe as shown in the following Table 9.

TABLE 9

| Compounding recipe | parts by weight |
| --- | --- |
| polymer | 100 |
| carbon black SAF | 80 |
| aromatic oil | 40 |
| stearic acid | 2 |
| polyvalent amine*1 | see Table 10 |
| zinc white | 4 |
| DPG | 0.3 |
| DM | 1.2 |
| sulfur | see Table 10 |

*1:4,4'-methylene dianiline

The Mooney scorch time and blowout temperature were measured with respect to the sample i and control sample in the same manner as in Example 4 to obtain results as shown in the following Table 10. Moreover, the vulcanization conditions were 155° C.×30 minutes.

TABLE 10

|  | Comparative Example 4 | Example 7 |
| --- | --- | --- |
| BR01 | 100 | — |
| sample i (halogen content: 0.6 wt %) | — | 100 |
| 4,4'-methylene diamine | — | 1.0 |
| sulfur | 1.5 | 1.0 |
| Mooney scorch time (min) | 19.8 | 19.1 |
| Blowout temperature (°C.) | 181 | 217 |

As mentioned above, the heat-resistant cross-linking (TP curing or amine curing) can effectively be carried out by using the halogenated polybutadiene series elastomers according to the invention. Further, the resulting vulcanizates made from the rubber composition containing the halogenated polybutadiene series elastomer according to the invention considerably improve the heat resistance without degrading the processability and tensile properties as compared with the conventional sulfur vulcanizing system. Therefore, the rubber compositions for tire according to the invention are suitable as a tire tread requiring the heat resistance, and also applicable for sidewall, inner liner, bead filler and the like of the tire.

What is claimed is:

1. A novel halogenated polybutadiene series elastomer having in its molecular chain the following structure:

(wherein A is one of the following six residues:

X is a halogen atom, R is a hydrogen atom or a methyl group, and each of x, y and z is zero or a positive integer).

2. The halogenated polybutadiene series elastomer according to claim 1, wherein a total amount of said structures I, II, and III is 0.001~0.03 mol per 100 g of said elastomer.

3. The halogenated polybutadiene series elastomer according to claim 2, wherein said total amount is 0.002~0.02 mol.

4. The halogenated polybutadiene series elastomer according to claim 1, wherein said elastomer is a halogenated styrene-butadiene copolymer.

5. The halogenated polybutadiene series elastomer according to claim 1, wherein said elastomer is a halogenated polybutadiene polymer.

6. A method of producing a novel halogenated polybutadiene series elastomer, which comprises reacting a polybutadiene series elastomer with at least one active halogen group-containing compound selected from the group consisting of the following compounds:

(wherein X is a halogen atom and R is a hydrogen atom or a methyl group) in the presence of at least one organic halogenating agent selected from the group consisting of an alkyl hypohalite, trihalo isocyanuric acid and an N-haloamide compound represented by the following general formula:

(wherein X is a halogen atom, A is a carboxylic acid residue, a sulfonic acid residue or a carbonic monoester residue, and B is a hydrogen atom, a halogen atom or a carboxylic acid residue).

7. The method according to claim 6, wherein said polybutadiene series elastomer is selected from the group consisting of polybutadiene, butadiene-styrene copolymer, butadiene-acrylonitrile copolymer, butadiene-methacrylic acid copolymer, butadiene-methyl methacrylate copolymer and butadiene-isoprene copolymer.

8. The method according to claim 6, wherein said active halogen group-containing compound is selected from p-bromomethyl benzoic acid and p-chloromethyl benzoic acid as said formula (I), α-bromophenyl acetic acid, α-chlorophenyl acetic acid and α-bromophenyl propionic acid as said formula (II) and α-bromomethyl acrylic acid, α-chloromethyl acrylic acid and α-bromomethyl crotonic acid as said formula (III).

9. The method according to claim 8, wherein said active halogen group-containing compound is used in an amount of 0.001~0.03 mol per 100 g of said elastomer.

10. The method according to claim 6, wherein said organic halogenating agent is selected from the group consisting of primary alkyl hypohalites, secondary alkyl hypohalites, tertiary alkyl hypohalites, N,N-dichloroethyl urethane, N,N-dichloromethyl urethane, N,N-dichlorobenzene sulfonamide, N,N-dibromobenzene sulfonamide, N,N-dichlorotoluene sulfonamide, N,N-dichloroacetoamide, N-chlorosuccinic acid imide, N-bromosuccinic acid imide and trichloro isocyanuric acid.

11. The method according to claim 10, wherein said organic halogenating agent is used at a mol ratio of 1:1 to said active halogen group-containing compound.

12. A rubber composition for tire comprising adding 0.3~10 parts by weight of a polyvalent amine to 100 parts by weight of a starting rubber consisting of 30~100 parts by weight of a halogenated polybutadiene series elastomer having in its molecular chain the following structure:

(wherein A is one of the following six residues:

X is a halogen atom, R is a hydrogen atom or a methyl group, and each of x, y and z is zero or a positive integer) and having a halogen content of 0.3~5.0% by weight and 70~0 parts by weight of the other conjugated diene series polymer.

13. The rubber composition according to claim 12, wherein said halogen content is 0.5~3.0% by weight.

14. The rubber composition according to claim 12, wherein said polyvalent amine is selected from the group consisting of hexamethylene diamine, heptamethylene diamine, methylene bis(cyclohexylamine), 1,3-di-4-piperidyl propane, 4,4'-dipiperidyl, triethylene diamine, 4,4'-methylene dianiline, diphenyl-p-phenylene diamine, di-β-naphthylphenylene diamine, diethylene triamine, triethylene tetramine and tetraethylene pentamine.

15. The rubber composition according to claim 14, wherein said polyvalent amine is used in an amount of 0.5~5.0 parts by weight.

* * * * *